UNITED STATES PATENT OFFICE.

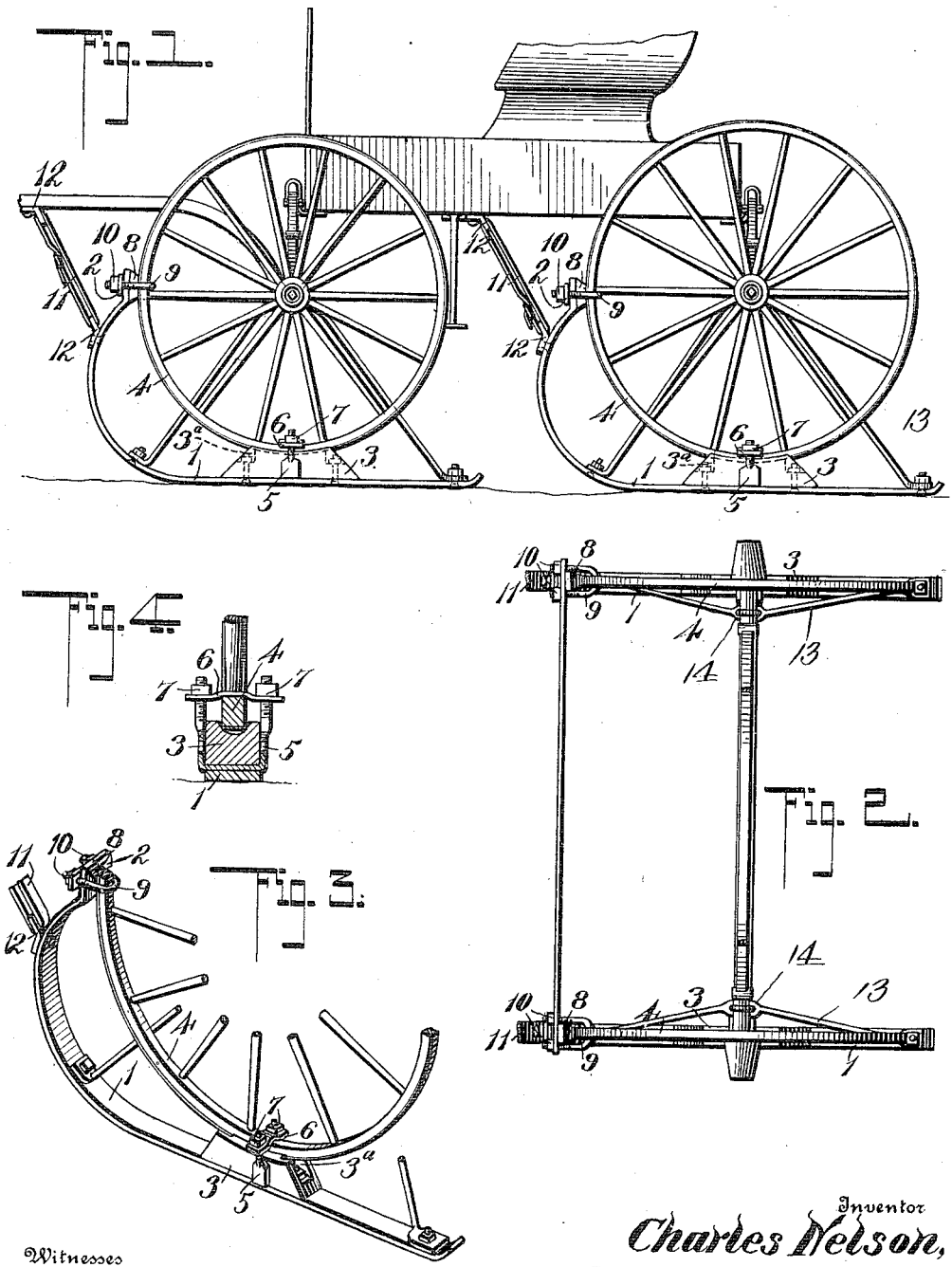

CHARLES NELSON, OF AXTELL, NEBRASKA.

BOB-SLED ATTACHMENT.

964,537.  Specification of Letters Patent. Patented July 19, 1910.

Application filed April 11, 1908. Serial No. 426,507.

*To all whom it may concern:*

Be it known that I, CHARLES NELSON, a citizen of the United States, residing at Axtell, in the county of Kearney and State of Nebraska, have invented a new and useful Improvement in a Bob-Sled Attachment, of which the following is a specification.

This invention relates to a bob sled attachment for buggies and other vehicles, and the object of the invention is the converting of a wheeled vehicle into one provided with runners.

The invention consists in the novel features of construction hereinafter described, pointed out in the claims and shown in the accompanying drawings, in which:

Figure 1 is a side elevation showing my attachment in use. Fig. 2 is a plan view of the forward pair of runners showing the vehicle's axle and wheels in plan, the body being removed. Fig. 3 is a detail perspective view illustrating the manner of securing a runner to a wheel. Fig. 4 is a transverse section through a wheel rim, a wheel block and a runner.

In constructing my invention I employ front and rear pairs of runners 1, the runners of each pair being connected at their upper forward ends by cross bars 2. As these runners are duplicates of each other, a description of one runner and the manner of securing same to a vehicle wheel will fully describe the invention. Upon the runner is arranged a wheel block 3, the upper face of which is grooved to receive a wheel 4, and the wheel is locked thereto by means of a U-shaped clamp 5, the bow portion of which passes between the runner 1, and the block 3, the under face of the block being suitably cut out to receive the bow portion of the member 5, and the free end portions of said member are formed cylindrical and threaded. These members project upwardly above opposite sides of the blocks and a connecting plate 6 is perforated to fit over the said threaded portions, the central portion of said plate being slightly offset to receive the felly of the wheel. The plate 6 is locked upon the member 5, by means of nuts 7. The wheel is therefore firmly clamped in the longitudinal groove of the wheel block 3, and held between said block and the plate 6. The forward upwardly turned end portion of the runner is also provided with a block 8, which bears against the wheel tire substantially in a horizontal line with the hub portion of the wheel and is locked thereto by a U-shaped clip 9 which incloses the rim of the wheel and the upper end portion of the runner and is held in place by the bar 2 previously mentioned, the end portions of which are perforated to fit over the ends of said clip, to which the bar is locked by suitable nuts 10. It will also be obvious that if desired a piece of felt or other soft material may be inserted between the wheel felly and the plate 6, and the bow portion of the clip 9 to prevent rubbing of the wheel. The wrapping or protecting of a polished or varnished surface against damage by rubbing is a well-known expedient and will be obvious to anyone employing such a device. I also employ straps 11 to connect the forward up-turned portions of the runners to the seat or shafts of the vehicle according to the position occupied by said runners. I prefer to attach these straps to angled brackets 12, carried respectively by the runners and some part of the vehicle. The wheel blocks 3 are cut away adjacent each end upon their upper faces as shown at 3ª to allow for the counter sinking of the nuts and upper ends of bolts employed in connecting said blocks to the runners. I also employ for each runner a V-shaped brace bar 13, the open portion of which is flattened to fit under the axle to which it is clamped by a U-shaped bolt member 14, similar to the clamps 9. The end portions of this brace are secured to the runners 1.

Having thus fully described my invention what I claim as new and desire to secure by Letters Patent is:—

1. A device of the kind described comprising a pair of runners, wheel blocks carried by the horizontal portions of said runners and grooved to receive wheels, locking means for locking the wheels to said blocks, blocks carried by the upward free end portions of the runners, clips engaging the wheel rims and inclosing said blocks and the end portions of the runners, and bars connecting the said runners and fitting over the free ends of said clips.

2. A device of the kind described comprising a pair of runners having up-turned end portions, wheel receiving blocks arranged upon the horizontal portions of said runners, means for locking wheels to said blocks, blocks carried by the up-turned end portions and engaging the wheels in the horizontal plane of the wheel hubs, a bar connecting the up-turned end portions of said runners, and means secured to said bar for holding the blocks carried by the up-turned portions of the runners in engagement with the wheels.

CHARLES NELSON.

Witnesses:
G. A. NELSON,
VERNON L. GARNER.